United States Patent
Pabis et al.

(10) Patent No.: US 7,424,084 B2
(45) Date of Patent: Sep. 9, 2008

(54) FUEL ASSEMBLY NOZZLELESS HANDLING TOOL AND METHOD

(75) Inventors: George S. Pabis, Lynchburg, VA (US);
Darel R. Clark, Lynchburg, VA (US);
Anthony A. Pugh, Forest, VA (US);
Raymond A. King, Lynchburg, VA (US)

(73) Assignee: Areva NP Inc., Lynchburg, VA (US)

( * ) Notice: Subject to any disclaimer, the term of this patent is extended or adjusted under 35 U.S.C. 154(b) by 0 days.

(21) Appl. No.: 11/811,740

(22) Filed: Jun. 11, 2007

(65) Prior Publication Data

US 2008/0112529 A1    May 15, 2008

Related U.S. Application Data

(62) Division of application No. 10/714,756, filed on Nov. 17, 2003, now Pat. No. 7,239,683.

(51) Int. Cl.
*G21C 19/00*    (2006.01)
(52) U.S. Cl. .................... 376/264; 376/261; 376/265; 376/267; 376/268
(58) Field of Classification Search ............ 376/264, 376/261, 265, 267, 268
See application file for complete search history.

(56) References Cited

U.S. PATENT DOCUMENTS

| | | | |
|---|---|---|---|
| 3,137,397 | A | 6/1964 | Nicoll et al. |
| 3,726,557 | A | 4/1973 | Ventre |
| 3,859,165 | A | 1/1975 | Radkowsky et al. |
| 4,081,086 | A | 3/1978 | Shallenberger et al. |
| 4,279,699 | A | 7/1981 | Kuhn |
| 4,460,536 | A | 7/1984 | Krieger et al. |
| 4,663,114 | A | 5/1987 | Cransac et al. |
| 4,699,760 | A | 10/1987 | Shallenberger et al. |
| 4,717,527 | A | 1/1988 | Gjertsen et al. |
| 4,834,934 | A | 5/1989 | Salton et al. |
| 5,319,686 | A | 6/1994 | Pizzano et al. |
| 5,465,282 | A | 11/1995 | Berglund et al. |
| 5,633,904 | A | 5/1997 | Gilligan, III et al. |
| 5,661,768 | A | 8/1997 | Gilligan, III et al. |
| 6,295,329 | B1 | 9/2001 | Maehara et al. |

*Primary Examiner*—Rick Palabrica
(74) *Attorney, Agent, or Firm*—Kenyon & Kenyon LLP

(57) ABSTRACT

A device and method to move a fuel assembly of a nuclear reactor, wherein the device eliminates the potential for dropping the fuel assembly due to stress corrosion cracking of the upper guide thimble sleeves that attach the top nozzle to guide thimbles.

11 Claims, 3 Drawing Sheets

FUEL ASSEMBLY NOZZLELESS HANDLING TOOL AND METHOD

CROSS-REFERENCE TO RELATED APPLICATION

This application is a divisional application of U.S. application Ser. No. 10/714,756, filed Nov. 17, 2003 now U.S. Pat. No. 7,239,683, herein incorporated by reference.

FIELD OF THE INVENTION

The current invention relates to handling of fuel assemblies for nuclear reactors. More specifically, the invention relates to a tool and method for movement of nuclear fuel assemblies without over stressing the top nozzle of the fuel assembly.

BACKGROUND INFORMATION

Present-day light water nuclear reactors, both pressurized water reactors and boiling water reactors, require fuel to be installed in a reactor pressure vessel prior to operation. The fuel is often in the form of a fuel assembly, where individual fuel rods, which contain a series of parallel arranged rods each containing stacked pellets, are held together by a structural skeleton arrangement.

After the reactor pressure vessel is operated and the nuclear fuel in the fuel assemblies is depleted, the depleted fuel assemblies must be removed and replaced with new fuel assemblies. Additionally, non-depleted fuel assemblies must be moved to other areas of the reactor core and inspected for defects prior to restarting the reactor. The moving of the fuel assemblies, both depleted and non-depleted, must be performed in a safe and controlled manner as dropping of a fuel assembly could lead to damage of nuclear fuel and potential release of radioactive material.

Detailed visual and radiographic inspections of fuel assemblies and special lifting devices (devices that move the fuel assembly) help prevent load lifting accidents due to degraded structural components. It has been found that after exposure to radiation, some fuel assemblies exhibit stress corrosion cracking of the upper guide thimble sleeves which attach the top nozzle of the fuel assembly to the guide thimbles.

Industry experience has also found that current devices and methods to lift structurally damaged fuel assemblies are costly for plant operators, while not eliminating the potential for load lifting accidents from problem prone areas such as failure of the top nozzle to guide thimble connection from stress corrosion.

If a fuel assembly exhibits stress corrosion cracking or some other structural defect, current practices require underwater disassembly of the fuel assembly and removal of the individual pieces or establishment of additional structural corrections to the damaged fuel assembly to allow an adequate transfer of the structural load of the assembly. Both of these repair alternatives are expensive and require significant structural analysis of the damaged fuel assembly to ensure a safe load lift.

There is a need for a fuel assembly lifting device and method which can be used with existing fuel assembly configurations in nuclear reactors, both pressurized and boiling water reactors.

There is a further need to provide a fuel assembly lifting device and method which will allow for safe movement of a fuel assembly when the fuel assembly has stress corrosion cracking of the upper guide thimble sleeves that attach the top nozzle to the guide thimbles.

There is still further need for a device which will properly interface with existing fuel handling equipment and storage racks for cost efficient effective movement of fuel assemblies.

SUMMARY

It is an objective of the present invention to provide a fuel assembly nozzleless handling tool and method which can be used with existing configurations of fuel assemblies used in nuclear reactors.

It is a further objective of the present invention to provide a fuel assembly nozzleless handling tool which will allow movement of a fuel assembly in a safe manner when the fuel assembly exhibits stress corrosion cracking of the upper guide thimble sleeves that attach the top nozzle to the guide thimbles.

It is a further objective of the present invention to provide a tool and method which will properly interface with existing fuel handling equipment and storage racks for cost efficient and effective movement of fuel assemblies.

The invention provides a method of handling a fuel assembly. The method provides for supporting a tool configured to handle the fuel assembly, and positioning the tool over a top of the fuel assembly. The method further provides for lowering the tool onto the top of the fuel assembly such that alignment pins engage a top nozzle of the fuel assembly and actuating a shaft to lower lock fingers into guide thimbles of the fuel assembly. The method also provides for positioning the lock fingers to a position below divots in the guide thimble in the fuel assembly to be engaged, engaging the lock fingers into the divots to an extended position, and lifting the fuel assembly and the tool.

The invention also provides a fuel assembly nozzleless handling tool configured to handle a fuel assembly. The tool comprises a mandrel shaft configured to travel a length of the tool. The tool also provides a mandrel plate connected to the mandrel shaft, the mandrel plate configured to move through actuation of the mandrel shaft and a finger shaft configured to travel from an unengaged position to an engaged position. The device further provides a finger plate configured to insert and retract the lock fingers into the guide thimbles, the finger plate moved by actuation of the finger shaft and a load plate. The device still further provides at least two lock fingers configured to interface with a fuel assembly guide thimble, and a mandrel for each of the two lock fingers, wherein the mandrel is configured to secure the lock fingers and retract the lock fingers.

DETAILED DESCRIPTION

Figure 1:
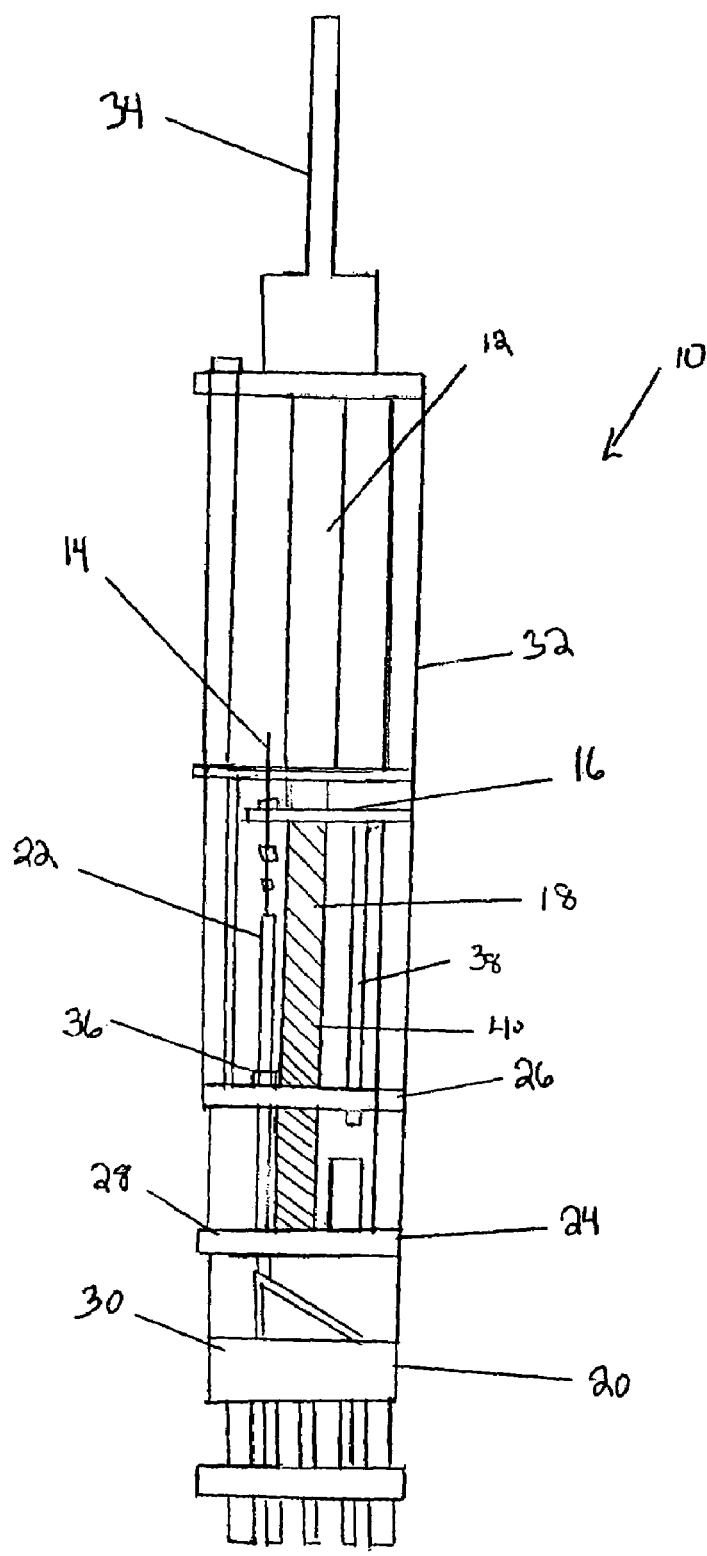
FIG. 1 is a side elevation view of a fuel handling nozzleless lifting tool in accordance with the present invention.

FIG. 1 illustrates a fuel assembly nozzleless handling tool 10 in conformance with the present invention. The fuel assembly nozzleless handling tool 10 is comprised of a mandrel 14, a mandrel shaft 12, a mandrel plate 16, a finger shaft 18, a lock finger 22, a finger plate 26 and a load plate 24.

The fuel assembly nozzleless handling tool 10 is a device which allows for lifting of fuel assemblies which exhibit structural defects which may affect overall lifting safety. The handling tool 10, therefore, prevents the need for permanent structural repair from being accomplished on structurally degraded fuel assemblies.

The tool 10 interfaces with the existing structures in the fuel assembly 20 in order to accomplish a load lift. To accomplish this, lock fingers 22 are used to interface with fuel assembly guide thimbles. The external diameters of the lock fingers 22 are configured to allow insertion of the lock fingers 22 into the openings of the guide thimbles in the top nozzle. In the extended position, the ends or tabs of the lock fingers 22 are configured to engage divots within the guide thimble where the guide thimble is swaged to the upper sleeve. The lock fingers 22 may be fabricated from a variety of materials, including stainless steel or Inconel. The lock finger ends or tabs may be in any configuration such that contact established between the lock fingers 22 and the dimples of guide thimble is sufficient to allow a vertical lift of the fuel assembly 20. In an unextended position, the lock fingers 22 are configured to be inserted into the guide thimbles with sufficient clearance such that the lock fingers 22 do not contact the inside contact edges of the guide thimbles. The ends of the lock fingers 22 may be made of a material which is softer than the material of the guide thimbles, thereby preventing damage to the fuel assembly 20 in the extended position.

The mandrel 14 is used to secure the lock fingers 22 into place in a fuel assembly 20 prior to lifting a fuel assembly 20. The mandrels 14 also retract the lock fingers 22 to a smaller profile in the unengaged position for insertion into the guide thimbles. The mandrels 14 are individually spring loaded to their respective lock fingers 22 to allow independent locking and unlocking of the lock fingers 22. The number of mandrels 14 and lock fingers 22 may be varied according to the number of connections desired to be established to the fuel assembly 20 to be lifted. In an exemplary embodiment illustrated, 20 lock finger/mandrels are used to lift the fuel assembly 20. Other numbers of lock finger/mandrels may be used according to the configuration of the fuel assembly 20 and the desired factor of safety for lifting.

The load plate 24 is configured to lift the weight of the fuel assembly 20 transferred through the lock fingers 22. The lock fingers 22 are supported with a spring interface by the load plate 24 to allow for variation in fuel assembly growth and divot position. The load plate 24 is attached to the mast 34 of the tool 10 via support rods 32 at each corner of the tool. Alignment pins 28 attach the load plate 24 to provide accurate positioning onto the fuel assembly 20. The alignment pins 28 may allow for fine adjustment of the tool 10 so that precise positioning occurs.

The finger plate 26 is used to insert and retract the lock fingers 22 into the guide thimbles of the fuel assembly 20. The finger plate 26 is a non-load bearing component and is connected to members 38 which connect to the mandrel plate 15 of the tool 10. The finger plate 26 may have an attachment 36 which allows/assists in the insertion and retraction of the lock fingers 22 during actuation.

The finger shaft 18 is configured to travel the full length of the full assembly nozzleless handling tool 10 to allow operator movement of the finger plate 26 via a screw drive 44. As illustrated, the finger shaft 18 is a screw 40 which may be controlled in a precision manner. The screw 40 may be of such a configuration such that the threads of the screw 40 allow for accurate positioning. The screw 40 may also be configured such that any configuration of threads per unit length may be used. Other types of actuation are possible, such as hydraulic actuation, for example, and as such the exemplary embodiment illustrated should not be considered limiting.

The mandrel plate 16 is used to allow insertion and retraction of the mandrels 14 into the lock fingers 22. The mandrel plate 16 is used to provide a structural connection which may be actuated for movement through movement of the mandrel shaft 12. The mandrel plate 16 is also configured to allow visual verification that the mandrels 14 are fully inserted through visual identification of position.

The mandrel shaft 12 travels the full length of the tool 10 to allow operator movement of the mandrel plate 16 via rotation and elevation change. The mandrel shaft 12 may be configured to rotate as illustrated, or may be moved through hydraulic actuation.

Figure 2:
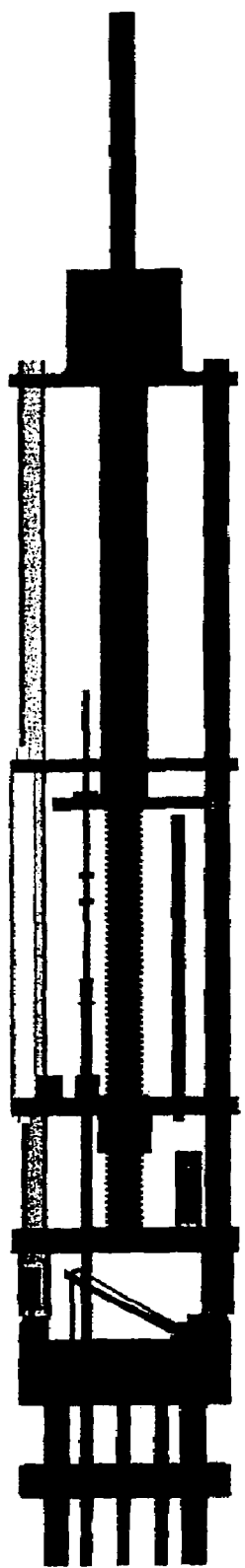
FIG. 2 is a side elevation view of the fuel handling lifting tool of FIG. 1 wherein lock fingers are in an unextended position.
Figure 3:
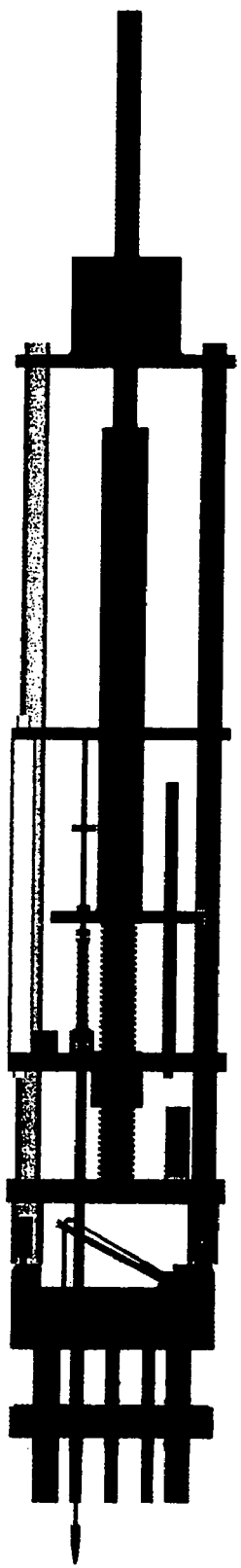
FIG. 3 is a side view of the fuel handling lifting tool of FIG. 1, wherein the mandrel shaft is lowered to extend the lock fingers.

Operationally, control components for the reactor core and fuel assemblies are removed to provide access to the individual fuel assembly 20 to be moved. The fuel assembly nozzleless handling tool 10 is positioned over the fuel assembly 20 to be moved as illustrated in FIG. 2. The fuel assembly nozzleless handling tool 10 is lowered onto the fuel assembly 20 and alignment pins 28 engage the top nozzle 30 of the fuel assembly 20. The finger shaft 18 is rotated by the tool operator to lower the lock fingers 22 into the guide thimbles of the fuel assembly 20. The mandrel shaft 12 is then lowered by the operator to allow spring tension of the mandrels 14 to be applied to the lock fingers 22. The finger shaft 18 is then rotated to perform a slow withdrawal of the lock fingers 22. As the individual lock fingers 22 reach divots that they are to engage, the lock fingers 22 spring into place, and the mandrel 14 is therefore positioned inside the guide thimble of the fuel assembly 20, locking a finger tab of the lock finger 22 into a divot of the guide thimble. The lock fingers 22 are withdrawn from the guide thimbles by actuation of the tool 10 until all of the mandrels 14 used are locked into position. Next, the mandrel shaft 12 is rotated to verify if all of the mandrels 14 are in the locked position and illustrated in FIG. 3. Finally, the fuel assembly nozzleless handling tool 10 is lifted by the auxiliary hoist of a fuel handling crane, as an example, and the assembly 20 is lifted and transferred to a new location.

The fuel assembly nozzleless handling tool 10 may be configured of any material, such as stainless steel, that is corrosion resistant and provides sufficient strength to lift the fuel assembly 20 with a desired factor of safety. The handling tool 10 is configured to engage guide thimble dimples below the upper end grid of the full assembly 20. Other dimple areas in the guide thimble may be used, however, and the illustrated embodiment is but one alternative configuration. Although illustrated as a configuration that will attach to a 17×17 pressurized water reactor fuel assembly, the fuel assembly nozzleless handling tool 10 could be reconfigured to fit any fuel assembly design that uses a swaged top nozzle sleeve.

The fuel assembly nozzleless handling tool 10 provides an alternative to expensive and lengthy permanent fixes to damaged fuel assemblies. The handling tool 10 may be configured to be single failure proof wherein failure of a single component on the handling tool 10 will not result in the dropping of the assembly 20 during a load lift.

In the foregoing specification, the invention has been described with reference to specific exemplary embodiments, thereof. It will, however, be evident that various modifications and changes may be made thereunto without departing from the broader spirit and scope of the invention as set forth in the appended claims. The specification and drawings are accordingly to be regarded as an illustrative rather than a restrictive sense.

What is claimed is:

1. A fuel assembly nozzleless handling tool configured to handle a fuel assembly, comprising:
    at least four support rods;
    a mandrel shaft configured to travel a length of the tool;
    a mandrel plate connected to the mandrel shaft, the mandrel plate configured to move through actuation of the mandrel shaft;
    a finger shaft configured to travel from an unengaged position to an engaged position;
    at least two lock fingers configured to interface with a fuel assembly guide thimble;
    a finger plate configured to insert and retract the lock fingers into guide thimbles, the finger plate moved by actuation of the finger shaft;
    a load plate connecting to the support rods the load plate configured to receive an end of the finger shaft; and
    a mandrel for each of the at least two lock fingers, wherein the mandrel is configured to secure the at least two lock fingers and retract the at least two lock fingers.

2. The device according to claim 1, wherein the lock finger is configured to engage divots in the guide thimble.

3. The device according to claim 1, wherein the mandrel is configured with springs to allow independent locking of individual lock fingers.

4. The device according to claim 1, further comprising:
    at least four support rods connected to the load plate, each of the at least four support rods positioned at a corner of the load plate.

5. The device according to claim 1, wherein the load plate is configured with arrangements to accept alignment pins of the fuel assembly.

6. The device according to claim 1, wherein the lock fingers are configured to be inserted into the fuel assembly where a guide thimble is swaged to an upper sleeve.

7. The device according to claim 1, wherein the lock fingers are made of stainless steel.

8. The device according to claim 1, wherein the lock fingers are made of Inconel.

9. The device according to claim 1, further comprising:
    alignment pins configured to engage a top nozzle of the fuel assembly, the alignment pins at a bottom of the tool.

10. The device according to claim 1, wherein the lock fingers are configured with tabs to engage divots of the fuel assembly.

11. The device according to claim 1, wherein the tool has 20 lock fingers and 20 mandrels.

* * * * *